United States Patent [19]

Bald

[11] Patent Number: 4,852,434
[45] Date of Patent: Aug. 1, 1989

[54] MACHINE TOOL WITH A SLIDING SCREW DRIVE

[75] Inventor: Hubert Bald, Bad Bereleburg, Fed. Rep. of Germany

[73] Assignee: Paul Forkardt GmbH & Co. KG, Erkrath-Unterfeldhaus, Fed. Rep. of Germany

[21] Appl. No.: 185,259

[22] Filed: Apr. 19, 1988

Related U.S. Application Data

[63] Continuation of Ser. No. 947,502, Dec. 29, 1986, abandoned.

[30] Foreign Application Priority Data

Dec. 28, 1985 [DE] Fed. Rep. of Germany ....... 3546251
Dec. 28, 1985 [DE] Fed. Rep. of Germany ....... 3546252
Sep. 6, 1986 [DE] Fed. Rep. of Germany ....... 3630441

[51] Int. Cl.$^4$ .......................... B23B 3/00; B23B 7/00; B23B 15/00
[52] U.S. Cl. ........................................ 82/118; 82/147; 82/148; 82/165; 318/35; 318/103; 318/569; 364/474.02; 279/1 H; 51/165 R; 51/165.92; 408/3; 409/240
[58] Field of Search ................. 82/2 B, 30, 31, 40 R, 82/DIG. 6, DIG. 7; 318/35, 51, 62, 101, 102, 103, 569, 625; 364/474; 279/1 H; 408/3; 409/240; 51/165 R, 165.92

[56] References Cited

U.S. PATENT DOCUMENTS

| 3,605,533 | 9/1971 | Dugle | 82/40 R |
|---|---|---|---|
| 3,757,179 | 9/1973 | Pepersen | 318/85 |
| 4,257,103 | 3/1981 | Suzuki et al. | 364/474 |
| 4,289,997 | 9/1981 | Jung et al. | 318/113 |
| 4,297,624 | 10/1981 | Komiya | 318/594 |
| 4,335,633 | 6/1982 | Boffelli | 82/31 |
| 4,567,794 | 2/1986 | Bald | 82/1 C |
| 4,639,645 | 1/1987 | Hartwig | 318/51 |
| 4,641,069 | 2/1987 | Fujioka et al. | 318/625 |

FOREIGN PATENT DOCUMENTS 3218083 11/1983 Fed. Rep. of Germany ..... 279/1 H
3218084 11/1983 Fed. Rep. of Germany ..... 279/1 H Primary Examiner—Frederick R. Schmidt
Assistant Examiner—William E. Terrell
Attorney, Agent, or Firm—Frishauf, Holtz, Goodman, & Woodward

[57] ABSTRACT

A machine tool having a work spindle with an electrically actuated clamping unit including a three-phase motor with a stationary stator. The motor is supplied with electricity from a control unit operating with frequency conversion, and the control unit is alternatingly also used for triggering a spindle drive motor. A sensor detects clamping force applied to a workpiece, and produces a signal used to reduce motor speed of the three-phase motor until a predetermined clamping force is achieved.

23 Claims, 7 Drawing Sheets

MACHINE TOOL WITH A SLIDING SCREW DRIVE

This application is a continuation of application Ser. No. 947,502 Filed Dec. 29, 1986, abandoned.

The invention relates to a machine tool having a work spindle that can be made to revolve, and an electrical clamping drive associated with it. The clamping drive includes a threephase motor and a trigger unit for the motor. A machine of this kind is disclosed in U.S. Pat. No. 4,567,794 issued to Bald.

The machine may be a lathe or a milling machine with an electrical tool clamp or chuck, or a drilling or grinding machine, and the like.

Background

From a brochure of the Siemens company entitled "Elektromechanischer Antrieb für Reitstockpinolen" [Electromechanical Drive for Tailstock Spindles], undated, an apparatus is known which can be flanged to the tailstock of lathes and includes a three-phase asynchronous motor, which is pole-changeable to alternate between virtually load-free fast speed and loaded creep speed. A strain gauge device detects the clamping force built up after meeting the workpiece, in order to adjust the clamping force in accordance with a predetermined value.

The pressing force is stored in a cup spring assembly.

The Invention

It is the object of the present invention to improve the machine tool of the generic type and embody it such that the clamping operation takes less time, the structural size is smaller, the machine as a whole is easier to operate, and overall production costs of the machine are reduced.

Briefly, the machine tool is provided with at least one further three-phase motor for a machine unit that is operated only in alternation with the clamping drive, and a continuously regulating trigger unit that operates on the principle of frequency conversion is provided for the motors. To trigger the motors in alternation, the outputs on the take-off side of the trigger unit are reversible, and at the same time there is alternating access to the motor parameters that are definitive for the particular motor to be triggered, and/or to algorithms, as well as to the associated actual and set-point values for the motor.

The invention is based on the following considerations:

The motor provided for the clamping drive must be able to meet rather extreme conditions. At least its rotor should have small axial and especially radial dimensions, so that the moment of inertia remains low. Nevertheless, it should develop an extremely high torque—even if only briefly—especially at low rpm, but should also be possible to drive it at high maximum rpm, so that both high clamping forces and short positioning times can be attained. Furthermore, the motor must be controllable with high dynamics, so that during the buildup of clamping force, which should be completed within only about two motor revolutions, beginning with a prior maximum rpm, a regulated motor shutdown is attained.

When a pole changeable motor is used, none of these conditions can be realized together, or they can be realized only very incompletely.

However, triggering units having an integrated microcomputer are known, which operate by the principle of frequency conversion (brochure by the AMK Company entitled "PUMASYN Drehstromregelantriebe" [PUMASYN Three-phase Control Drive Mechanisms]) and enable meeting the above-described requirements, with adaptation to a suitable clamping drive motor. Accordingly, the invention preferably provides for the use of such control units, so as to be able to exploit the thereby available possibility for the clamping motor of combining both extremely high torque in the low rpm range and very high maximum rpm. The attainment of the very high torques at low rpm—with respect to the structural size—is due to the fact that with the current imposed upon the motor, the values for the magnetizing current component and the values for the torque-forming current component can be optimally apportioned by the microcomputer in a constant adaptation to the operating state of the motor.

On these conditions, with the same structural size and the same electrical output supplied to the motor stator, when the provided trigger unit is used for the clamping motor, a run-up torque can for instance be attained which is greater by a factor of 8–10 than with a kind of triggering which does not provide this apportioning of the current component, for example triggering by means of a contactor or by means of a trigger unit having phase control.

The high regulating dynamics required—especially with regulated buildup of the clamping force with the participation of a spring clamping force storage means—is also attained by the computer-controlled current component apportioning. For practical use, however, the system comprising a three-phase motor and computer-controlled trigger unit proves to be much too expensive in comparison with the conventional hydraulic clamping system.

Therefore the fact is taken into account that as a rule the clamping operations of the machine tools in question are accomplished during the shutdown of at least the spindle drive motor, and possibly the additional feed motor also provided, and that these motors in any case are driven with a convenient trigger unit. If at least one further motor is now used as this trigger motor, then it can make "joint use" of the same trigger unit, in alternation, as the clamping motor.

The trigger unit should be modified for this purpose, however. Its outputs are alternatingly connected to one or the other motor, and the same applies to its inputs, to which the actual signal from the motors is supplied; in the simplest case, this involves the output signal of an angle transducer provided on the motor. Furthermore, the two motors to be triggered will have entirely the same parameters only in exceptional cases; yet such parameters are to be taken into account for the operation of the trigger unit, and the situation is exactly the same for the regulating characteristics, which should for instance be different for a lathe spindle drive than for the clamping drive. When switching over the outputs and inputs of the trigger unit, a switchover is also made to the particular parameters and regulating algorithms applicable to the particular motor; the same is also true for the set-point and actual values of the motors.

This conception is much less complicated and expensive than if each individual motor were assigned its own trigger unit, because the expensive components, and in particular the power stage, do not need to be modified and only a single one needs to be provided.

However, this also makes the entire machine tool easier to operate. Since fewer components are involved, there is less likelihood of malfunctions.

The concept according to the invention also has an effect on the embodiment of the mechanical parts of the clamping unit. According to the teaching of the above-mentioned German patent DE-PS No. 33 14 629, the stator of the clamping drive motor is disposed stationary, while the rotor rotates with the spindle, and its drive moment is converted by means of a rolling screw drive into an axial motion for driving clamping jaws. Because this system is very low in friction, with suitable triggering of the clamping drive motor it also permits accurate apportioning of the clamping forces.

A further conventional type of clamping units having an electrical drive motor is described in the company publication of the Paul Forkardt GmbH & Co. KG#500.01.7 D/1979 entitled "Elektrospanner" [Electric Clamping Tools].

These electric clamping tools include an electric motor, which for clamping tools, for instance in milling machines, may be stationary and may be coupled only for the clamping operation, but may also be embodied such that in lathes it rotates with the spindle. The drive moment of the motor is transmitted via a step-down gear and a torque limiter to the nut of a sliding screw drive, which cooperates with a tension/compression tube. The torque limiter is embodied as a so-called click and rachet wheel, in which the radial serration disposed on two different parts can unlatch after overcoming an adjustable spring force. By varying the spring force, the clamping force introduced to the tension/compression tube can thus be varied. Because after the torque limit is reached the click and rachet wheel can be latched and unlatched via a plurality of teeth, the torque continuously produced by the electric motor is converted into a train of torque pulses, which also increases the spanning force generated by the sliding screw drive.

In order to realize a clamping force storage means, which is always recommended at the high machine tool work spindle speeds typical at present, a spring element made up of cup springs is interposed in the work spindle bore between the tension/compression tube and the clamping means (such as lathe chucks). The disadvantages of the construction having the sliding screw drive are the following:

It is relatively inaccurate and difficult to adjust the clamping force at the mechanical torque limiter, and it must be done by hand and is therefore relatively time-consuming and can virtually not be automated. In addition to the imprecision of the clamping force, dictated by the kind of adjustment, there is a further and even greater component of imprecision. This is due to the wide range of possible coefficients of friction that are operative in the sliding screw drive. The coefficient of friction may range from $\mu=0.1$, for a well-lubricated and clean sliding screw drive, to more than $\mu=0.2$ where there is not enough lubricant and there is insufficient maintenance. Even with a limit torque that remains constant, this means a possible fluctuation of 100% in the clamping force.

The stroke speeds attainable are too low and should be at least 20 mm per second. The opening and closing times that are dependent thereon in fact contribute directly to the unproductive standby periods. The low stroke speeds are caused by the fact that the asynchronous three-phase motors triggered by reversing contacts put out a relatively low torque, so that to attain the necessary clamping forces a relatively high gear reduction becomes necessary. Increasing the engine speed beyond 3000 rpm is impossible in principle with a mains frequency of 50 Hz, and increasing the motor output is prohibited because of the structural volume that would necessarily have to be increased, and in particular the volume of the motor stator that revolves with the spindle, the centrifugal moment of which would be increased considerably thereby. Finally still another disadvantage has to do with this last situation mentioned.

In modern lathes of the present day, speeds of 6500 rpm and higher are typical. When electric clamping tools are used with a revolving motor stator, then because of the extremely high centrifugal forces at these rpm, the limits for strength of the motor components would rapidly be reached.

The functional superiority of the clamping unit having a rolling screw drive must, however, be bought at the expense of considerably higher production cost, which result above all from the necessarily more-complex trigger unit for the electric motor and from the rolling screw drive.

The higher production costs of the electric clamping tool with a rolling screw drive are certainly justifiable if all the functional advantages can be made use of in a practical application.

In many applications, however, even in modern lathes the advantages resulting from a rolling screw drive are not exploited fully. This is particularly true when a through bore for the passage through it of rod work is not required on the electric clamping tool and when the considerably lower number of clamping operations possible with the sliding screw drive until reaching the wear limit as compared with a rolling screw drive are still acceptable.

The disadvantage of the sliding screw drive can be lessened, however, if the threaded faces of the nut and-/or the spindle meshing with one another are subjected to a surface treatment that reduces drive friction. It is possible even after the conventional metallurgical tempering operations to apply firmly adhering, very thin layers of extremely hard and friction-reducing material, which are preferably to be precipitated out of the gas phase using the CVD method. Among the coating materials that may be suitable are titanium nitride, for example, but a diamondlike carbon is particularly suitable, such as that described in the publication entitled "Battelle aktuell" ]Battelle Update] dated Sept. 2, 1986, or the publication entitled "Ion Beam Deposition of Thin Films of Diamondlike Carbon", by Aisenberg and Chabot in J. Appl. Phys., 42/1971, pages 2953-2958.

A sliding screw drive improved in this way in terms of the friction conditions can then be made with a larger diameter, and possibly even hollow, without requiring a higher-power clamping drive motor. Conversly, with a smaller diameter of the drive, a smaller motor could be selected, or a reducing gear could be dispensed with. Finally, it is also possible to combine these provisions with one another.

In order to use this kind of clamping unit with high-speed lathes, it is recommended that not only the stator but the rotor of the clamping drive motor as well be disposed stationary with respect to the work spindle revolution and for the clamping/unclamping operation to couple it with the drive; this coupling is preferably electrically switchable.

The invention will be described in greater detail below, referring to the accompanying drawings.

Drawing

DETAILED DESCRIPTION

Figure 1:
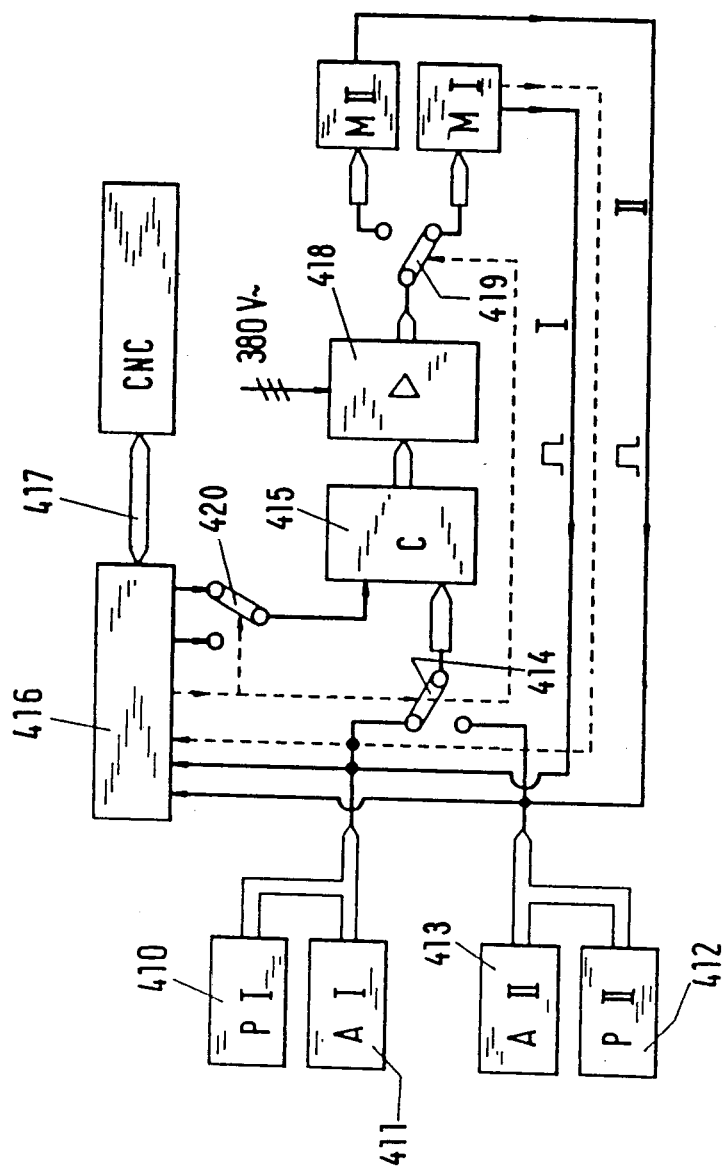
FIG. 1 is a block circuit diagram of a machine tool.

The principle of the invention will first be described, referring to the accompanying block circuit diagram of FIG. 1.

As an example, a lathe having a motor MI for the clamping drive and a motor MII for the work spindle drive is assumed. Each motor is equipped with an angle transducer, which for example furnishes one output pulse per degree of rotational angle. By differentiation in accordance with time, the rotary speed is obtained, and by differentiation a further time, the rotational acceleration is obtained. The motor parameters required (such as moment of inertia of a rotor and other fixed data) are stored in associated memories 410 for the motor MI, and 412 for the motor MII.

The corresponding regulating algorithms are similarly stored in memories 411 (for the motor MI) and 413 (for motor MII). The actual values and the outputs of the memories—for the sake of simplicity, the connections are shown as buses—reach a reversing switch 414, so that only the data belonging together can be supplied to the regulator 415 at a given time. The actual values are also sent to an interface 416, which communicates via a bus 417 with a conventional CNC machine control. The positioning signals of the regulator 415 reach a control variable converter or end stage 418, which converts the supplied mains power, in this case 380V mains voltage, threephase, into the particular set stator currents required for the two motors, which are switched depending on the position of the switch 419 to one of the motors MI or MII. The CNC control also furnishes the set-point values via the interface, and the setpoint values are also switched over by means of the switch 420. All three switches are controlled from the CNC control via the interface. The switches shown, but especially the switches 414 and 420, can in practice naturally be embodied as semiconductor switches.

It is assumed that one workpiece has just been completely finished and has been unclamped. The switches are located in the positions shown, because with the work spindle stopped the clamping chuck of the motor MI was the last to be actuated in the unclamping direction. After a new blank has been inserted into the chuck, the motor MI is supplied with current such that it runs up with maximum rotary acceleration up to a set-point rpm, which is monitored by comparison of the actual and set-point values. Because of the tolerances of the blank, it cannot be predicted how many revolutions the clamping motor can execute. When the clamping means driven by the motor MI (for example the clamping jaws of a chuck) meet the workpiece, a signal is generated by means of a clamping force sensor, and this brings about a continuous reduction of the rotary frequency with a simultaneous increase in the clamping force, such that precisely when the intended clamping force value is attained, the rotational speed of the clamping motor assumes a certain predetermined residual value, in this case the value of zero.

Depending on the design of the trigger unit, there are two further possibilities for obtaining a trigger signal when the clamping means meet a workpiece, for example: If the trigger unit is designed such that it regulates the rpm of the motor to a constant value, then the sudden high load causes a sharp increase in the required current, which can be detected and evaluated. Contrarily, if the trigger unit is designed such that regulation to a constant output torque is performed, then the sudden load increase causes a drop in the rpm, which can be detected and evaluated via the corresponding transducer (for the actual value). In the drawing, the latter case has been assumed for the sake of simplicity; for one skilled in the art it is understood that the regulator 415 must also be supplied via interface 416 with the output signal of the clamping force sensor, if such a sensor is used (this is suggested with the dashed line). If a clamping force sensor is not used, the regulation is done by using a torque signal.

Once the clamping operations has ended, a switchover to the motor MII can be made for performing the machining operations. The commands required for this are furnished in the usual manner by the CNC control. Once the machining program has run its course, the switches are switched back again, and the operations take place in the reverse sequence for unclamping the workpiece.

It should be noted that the power requirement for a work spindle drive of a lathe and that for its clamping chuck drive are at least of somewhat comparable magnitude, so that the dimensioning of the end stage is appropriate for both. It should also be pointed out that instead of the clamping chuck drive, or alternatively with it, the drive for the tailstock spindle can also be actuated with the main spindle drive trigger unit. The adoption of the invention to other types of machines will be readily accomplished by one skilled in the art from the above teaching.

The ON duration of the clamping drive motor is generally at maximum 2%, with the maximum output having to be brought to bear only for a fraction of this time. Thus the motor can be embodied as very small, without the danger of thermal overload. Contrarily, the spindle drive should be designed for an ON duration of 100%, so that the motor MII is substantially larger than the motor MI. This can be taken into account, however, by means of the different parameters supplied to the regulator, and the same applies for the resultant different regulating algorithms.

In the block circuit diagram of FIG. 1, the reverse switching operations and the corresponding alternating access to the motor parameters, regulating algorithms, actual values and set-point values are associated with the internal computer of the trigger unit; alternatively, the computer of a higher-level CNC control of the entire machine can be used.

The three-phase motor is preferably embodied as a shortcircuit rotor motor, preferably an asynchronous motor, because this has advantages in terms of price and construction, especially if the stator of the clamping drive motor is stationary but it rotor rotates with the spindle.

Because clamping units having sliding screw drive are naturally preferred for reasons of cost, clamping units of this type will be primarily described below.

In order to clearly explain the demands made of the motor trigger unit, some relationships and facts will first be described in detail below. Some concrete dimensioning data will be used, such as may be applied to the clamping unit shown in FIG. 3 and to be described in detail later.

The clamping force $F_A$ amounts to 70,000N. For the sake of minimum wear, the thread diameter D of the sliding screw drive becomes larger than would actually be necessary from the standpoint of material strength, and in fact it is designed for D=40 mm. The thread pitch is assumed to be p=2 mm. The theoretically necessary torque $M_{ds}$ for operation without any friction at all at the sliding screw drive is, using a simplified formula, $M_{ds} = F_A \cdot p/2\pi \approx 22$ Nm. With an assumed upper value of $\mu = 0.2$ for the coefficient of friction, the friction torque becomes $M_{dR} = F_A D/2\mu = 180$ Nm. This shows that the friction may be approximately 12 times larger than the useful torque.

In order to be able to attain a stroke speed of v=20 mm/s, the maximum rotational speed at the sliding screw drive must be n=10 rps, or n=600 rpm. Assuming that with a clamping unit for $F_A$=70,000N, the rotor diameter logically must not exceed the value of 160 mm and the rotor width must not exceed the value of 50 mm, then with the above-described trigger unit being used, the maximal torque becomes 110 Nm up to a motor speed of 180 rpm.

If the torque to be brought to bear, with a cofficient of friction of $\mu$=0.2, also taking into consideration the axial roller bearing involved, is estimated to be Md,ges*$\approx$320 Nm, then it becomes clear that the reduction gear ratio i of the planetary gear must be on the order of i$\approx$1:3. From this resultant gear reduction ratio, it is clear that to establish a stroke speed of v=20 mm/s in fast speed—however with a low torque requirement—the motor must attain a maximum rpm of Nmax*=1800 rpm. For the sake of lower production costs, a smaller structural size with a motor rotor and the desired freedom from wear, the only type of motor to be considered can be a threephase motor.

One skilled in the art of motors will recognize that to meet both demands, namely first an extremely high torque with a small structural size and low rpm, and on the other hand a very high rpm in view of the multipolarity of the stator to be provided, while simultaneously meeting the requirement for good regulating dynamics, a high-grade trigger unit, such as the PUMASYN unit mentioned above, is necessary.

Changing the gear reduction ratio i of the planetary gear in one or the other direction while simulataneously maintaining the maximum stroke speed will hardly lessen the demands made on the motor and trigger unit, because with the mode of operation under discussion here, when the maximum rpm is increased the maximum torque is decreased—and vice versa.

The mode of operation that must necessarily be performed when building up the clamping force magnitude, when a sliding screw drive is used, cannot be precisely adjusted via the motor torque, because the coefficient of friction varies so widely.

Instead, the influence on the motor must be effected by using a sensor for continuous detection of the actual value of the clamping force. Furthermore, shutting down the clamping motor cannot be effected such that the engine rpm is regulated downward continuously to the value of zero until the predetermined clamping force is attained. To lessen the "stick-slip effect" that arises with sliding screw drives, it must instead be driven until the end at a predetermined minimum rotary speed, and then the motor must be shut down abruptly when the predetermined clamping force is attained. This requires great regulating dynamics on the part of the electrical drive as provided by the high-grade triggering unit.

Following these more theoretical considerations, the exemplary embodiment shown in FIGS. 2–7 will now be described.

Figure 2:
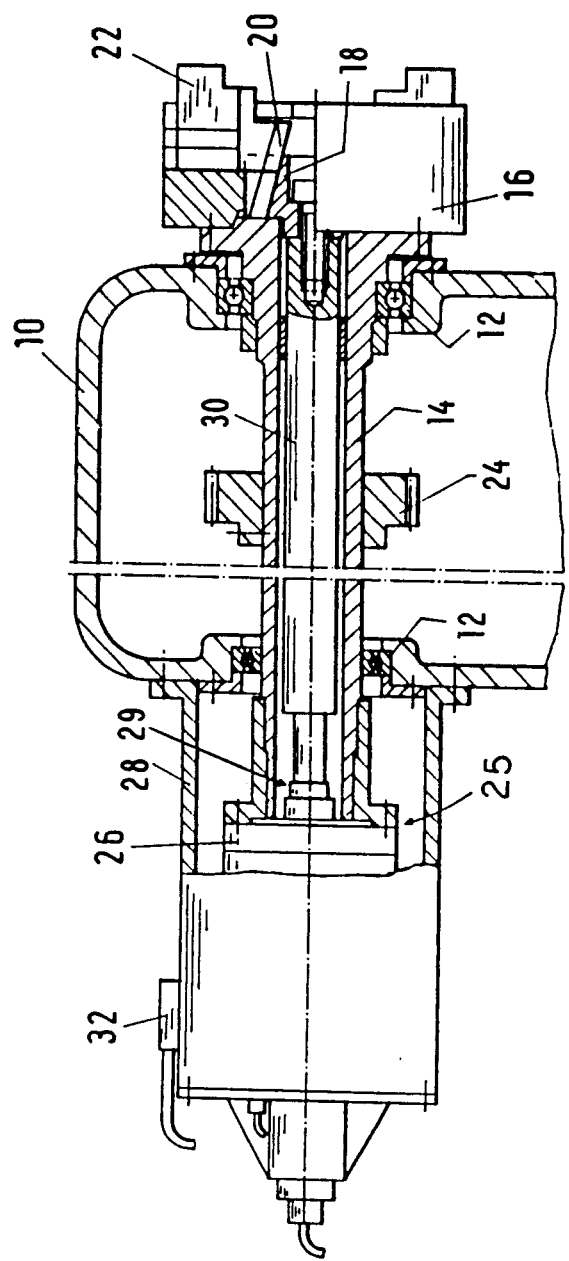
FIG. 2 shows a vertical section taken through a spindle stock of a lathe according to the invention.

In FIG. 2, the spindle box 10 is shown with the spindle 14 supported in roller bearings 12. At one free end of the spindle, there is a clamping chuck body 16, which axially displaceably receives a clamping piston 18, which via wedge guides 20 actuates the clamping jaws 22 in a manner known per se. The spindle drive is effected via a gear 24, which is for example connected via a toothed belt (not shown) with a spindle drive motor (not shown, but marked MII in FIG. 1).

At the other free end of the spindle 14, the spindle carries the rotor 26 of a clamping motor 25, the stator 41 (see FIG. 3) of which is housed in a housing 28 flanged to the spindle box 10 (see motor MI in FIG. 1).

Extending through the hollow spindle 14 is a tension/compression tube 30, which on the chuck end is joined to the clamping piston 18 and on the clamping motor end is connected to screw drive 29, the nut of which is rotatable by the clamping motor 25 relative to the spindle 14. The terminal box for the supply of current to the stator is shown at 32.

Figure 3:
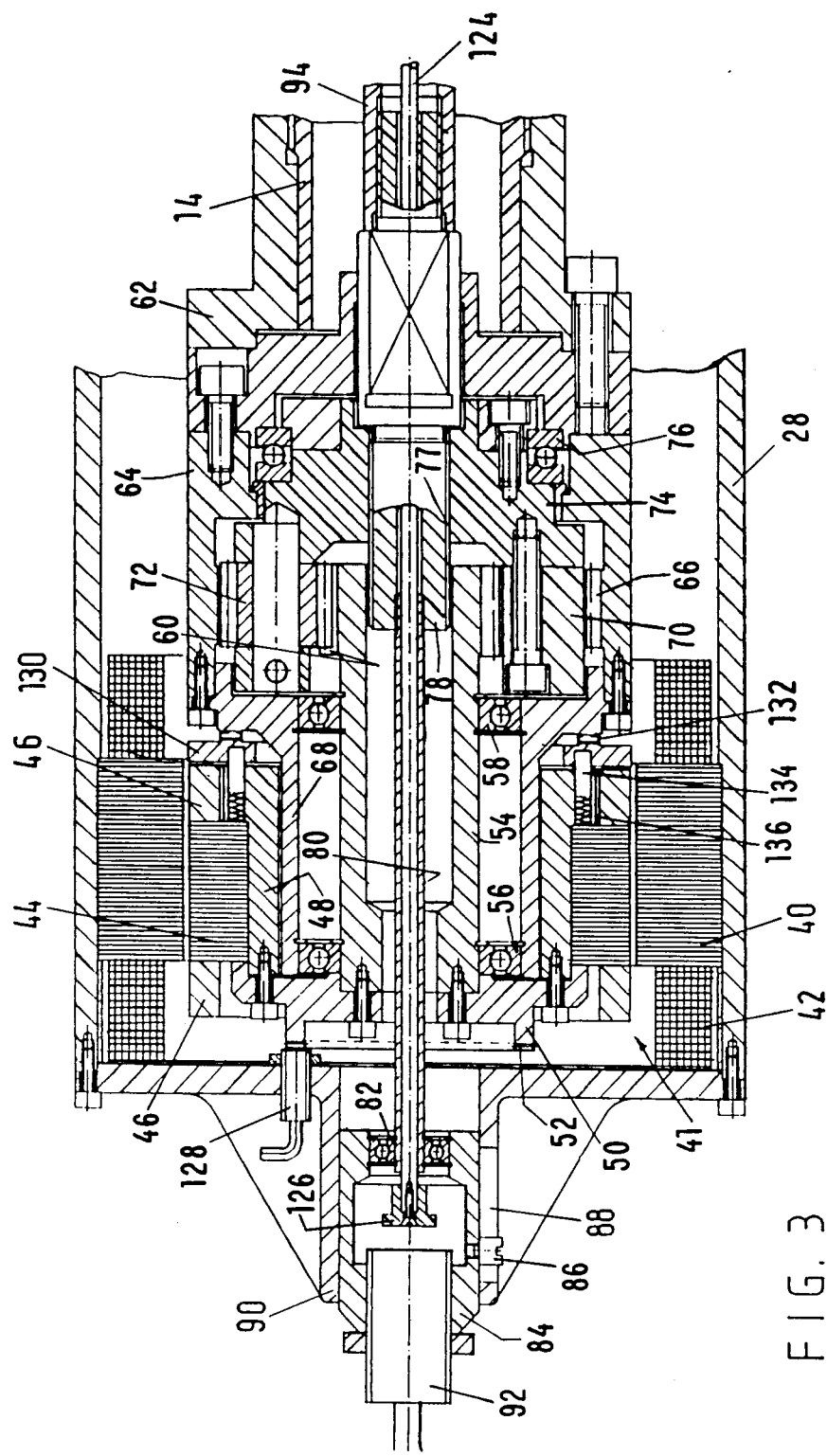
FIG. 3 is an axial section taken through the clamping drive motor of FIG. 2.

In FIG. 3, the housing 28 is shown with the stator 41 of the clamping motor, including the yoke 40 with the winding 42. The rotor embodied as a short-circuit rotor surrounds the core 44 with the short-circuit rings 46. It is clamped firmly to a sleeve 48, the end flange 50 of which has a radial serration 52, which rotates before a stationary inductive transducer 128, which furnishes one pulse per unit of rotary angle; the use of these pulses will be described later. The end flange 50 is screwed together with an inner tube 54 coaxial with the sleeve 48; the inner tube 54 is supported in roller bearings 56, 58 and has an outer serration 60 on its free end.

A sleeve 62 is screwed onto the free end of the spindle 14 and a pipe section 64 is connected to the sleeve; the pipe section has an inner serration 66 at the level of the serration 60. On its end remote from the spindle, a bushing 68 is screwed on, and the outer rings of the roller bearings 56, 58 are fixed in this bushing.

In the annular space between the serration 60 and 66, there is a sun wheel 70 with planet pinions 72, which mesh with the serrations 60 and 66; the sun wheel 70 is screwed to the threaded drive nut 74 and is supported axially on the pipe section 64 by means of a face bearing 76.

Accordingly, the sleeve 62, the pipe section 64 and the bushing 68 are joined to the spindle 14 in a rotationally fixed manner. The components connected to the rotor 26 of the clamping motor are rotatable relative to this above assembly and to the stationary housing 28, these components being the sleeve 48, the end flange 50 and the inner tube 54. Upon a rotation of this latter group relative to the spindle 14, the sun wheel accordingly will travel through an angle that depends on the gear reduction ratio of the planetary gear, embodied by the serrations 60, 66 and the pinions 72. This rotation of the sun wheel is transmitted to the nut 74 and converted by means of the thread 77 into an axial displacement of the driving screw 78 and the components joined to it.

These components include, on the side remote from the spindle 14, a guide tube 80, the free end of which is coupled via a roller bearing 82 to a carriage 84 in such a manner that the carriage—which is secured against rotation by means of a screwed-in cam 86, which moves in an oblong slot 88 of the housing attachment 90—is moved in a coupled manner by the driving screw 78. The carriage 84 has a measuring head 92 which will be described in detail later.

Figure 4:
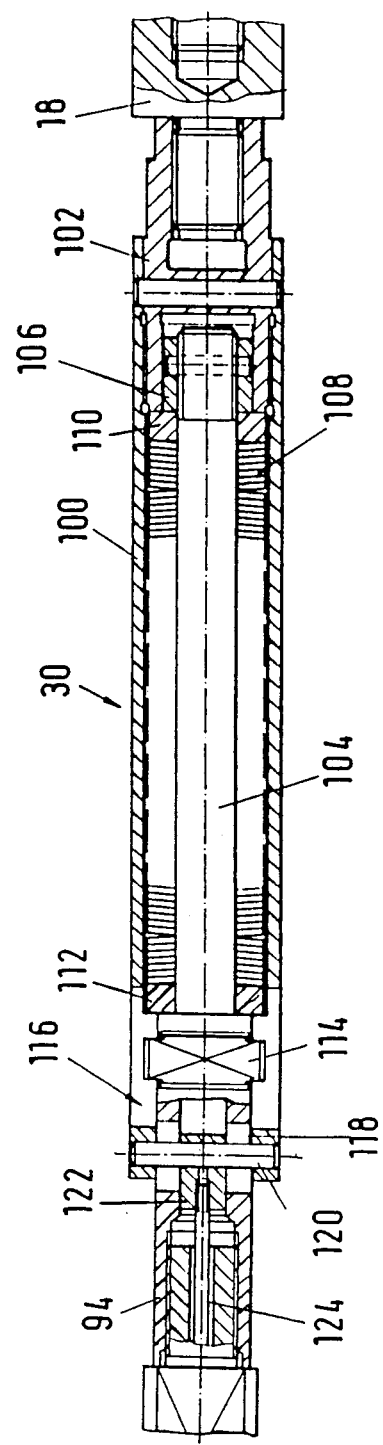
FIG. 4 is an axial section taken through the tension/compression tube of FIG. 2.
Figure 5:
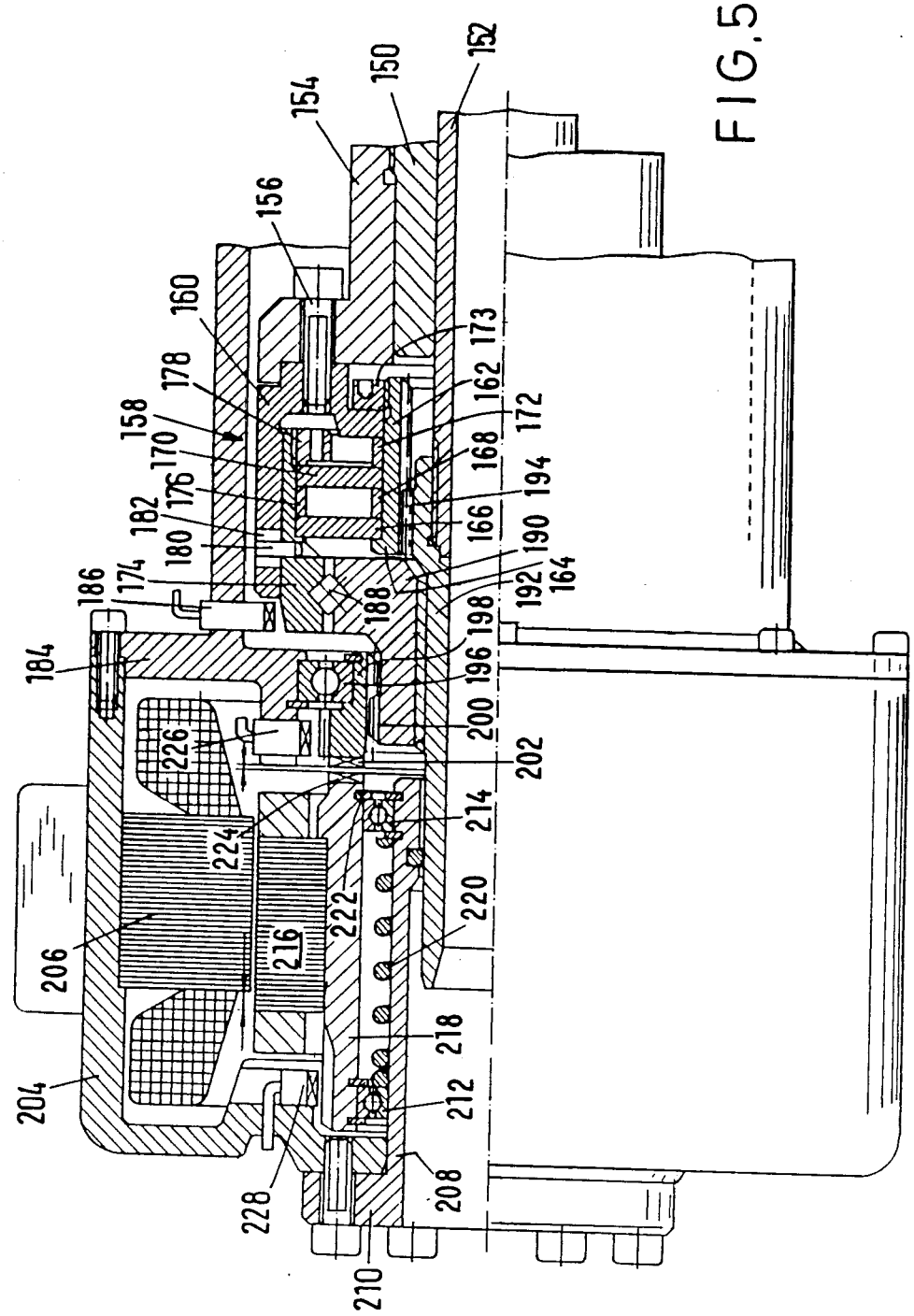
FIG. 5 is a fragmentary axial section taken through the spindle stock of a lathe in a second embodiment of the invention.

On the side of the driving screw 78 oriented toward the spindle 14, the driving screw is joined in a rotationally and axially fixed manner with the tension/compression tube 30 via the tubular connection piece 94. The structure of the tension/compression tube 30 is shown in FIG. 4, which will now be described in detail.

The tension/compression tube 30 includes an outer tube 100, which is rotationally and axially fixedly connected to a stop sleeve 102, into which the clamping piston 18 is coaxially screwed. The rod 104, on the chuck-side end of which the coupler bushing 106 is located, is located in the outer tube 100; cup spring assemblies 108 are disposed between the outer tube and the rod. These assemblies are supported on the chuck-side on the sleeve 102 via a pressure ring 110, which can however be shifted by the coupler bushing 106 in the direction of the clamping motor in response to compression of the cup springs, when the rod 104 is pulled out of the outer tube (toward the left in FIG. 4).

On the side remote from the chuck, the cup spring assemblies 108 are supported on a shoulder of the outer tube 100 via a second pressure ring 112. This pressure ring is once again shiftable into the outer tube 100, however, which compresses the cup springs, whenever the rod 104 is pushed into the outer tube 100 (toward the right in FIG. 4).

The connection piece 94 has a wedge 114, which engages axial grooves 116 of the outer tube 100 and thus joins the connection piece 94 and the outer tube 100 to one another in a rotationally fixed manner, yet permits relative shifting of the tube in both axial directions, in each case in response to compression of the cup springs, as explained above.

Extending through oblong slits 118 of the connection piece 94 in a radial direction is a pin 120, which is joined in a rotationally fixed manner to a sliding block 122, which is guided in an axially shiftable manner in a bore of the connection piece 94. One end of a sensor rod 124 is screwed into the sliding block, extending through the driving screw 78 of the guide tube 30 as far as the other side of the roller bearing 82, where it has a sensor head 126. Upon a relative axial shifting of the outer tube 100 and rod 104, a relative shifting of the sensor head 126 to the measuring head 92 accordingly takes place as well. The sensor head 126 and the measuring head 92 cooperate in such a way that in accordance with the spacing between them an electrical signal (analog or digital) is generated in the measuring head, which is representative of this distance between them and thus representative of the amount of compression of the cup spring assemblies 108, which serve as storage means for clamping force.

The cooperation of the embodiment as described so far with the trigger unit will now be explained, referring to FIGS. 1 and 6; FIG. 1 has already been explained above.

Figure 6:
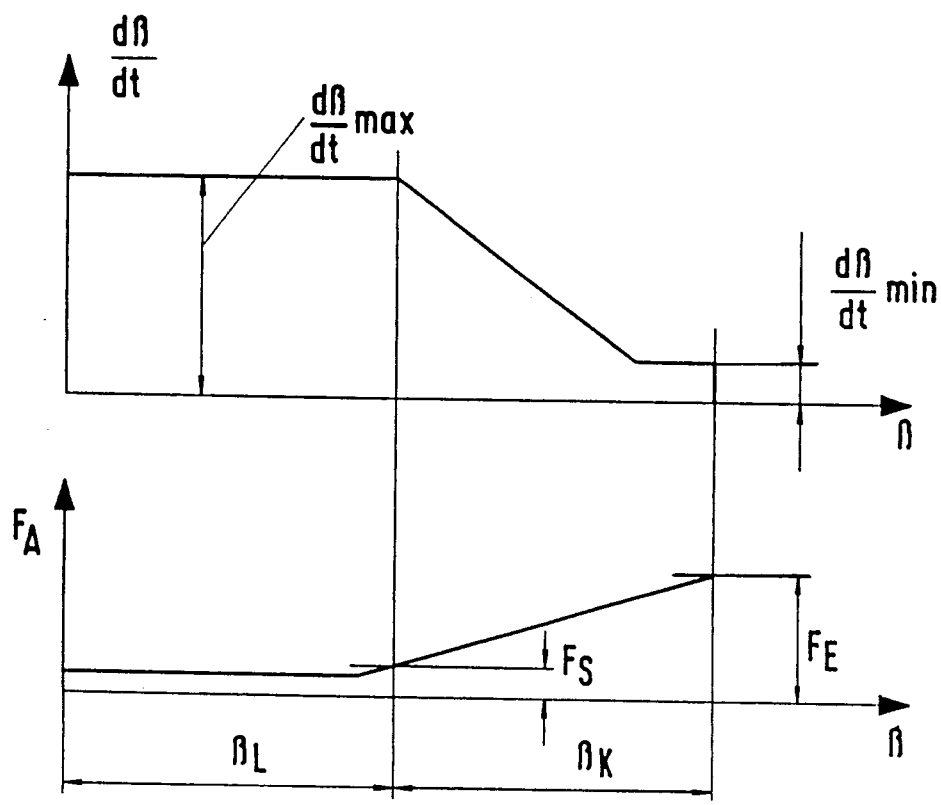
FIG. 6 shows a diagram in which the clamping force and the angular velocity of the speed are plotted as a function of the rotor angle for one clamping operation.

Because of the fact that the sliding screw drive operates by the so-called stick-slip mode, the regulating algorithm is laid out in accordance with FIG. 6. The lower curve shows the course of the output signal of the sensor 92/126 as a function of the rotational angle of the clamping motor rotor, which is marked $\beta$. During the idle stroke $\beta_L$, only a very slight force is measured, corresponding to the friction in the chuck. As soon as the chuck jaws meet the workpiece, the force increases, and as soon as a predetermined value $F_S$ is attained—which is higher only by a certain safety margin than the force value of $\beta_L$—the rotational speed $d\beta/dt$ (upper portion of the diagram of FIG. 6) is reduced, for example linearly as shown, while at the same time the clamping force $F_A$ rises. The rotational speed must not fall below a minimum value $d\beta/dt$ min, however, so that the "slip" operation continues to be maintained. Only once a predetermined clamping force value of $F_E$ is attained, is the rotational speed of the motor abruptly dropped to 0.

Now that the clamping operation has thus been ended, a switchover to the motor MII can be made to perform the machining steps. The commands required for this are furnished in the usual manner by the CNC control. After the machining program has been completed, the switches are switched back again, and for unclamping the workpiece, the operations logically take place in reverse order.

For the case where, in a drilling and milling machine, for example, the clamping means serves to receive interchangeable tools each having the same shaft diameter, then a sensor for ascertaining the actual value of the clamping force can be dispensed with. Because in the clamping operation in this case—beginning at a predetermined angular position of the clamping motor rotor in the opened state of the clamping means—a predetermined clamping force, with a deformation derived from it of a clamping force storage spring, is established once an associated constant rotational angle has been traversed, the control of the clamping motor can be accomplished using only the measured actual value for the rotational angle.

It should be noted that the power requirement for a work spindle drive of a lathe and for its clamping chuck drive are at least approximately of the same magnitude, so that the dimensioning of the end stage is suitable for both. It should also be noted that instead of the clamping chuck drive, or in alternation with it, the drive for the tailstock spindle can also be actuated with the main spindle drive trigger unit. The adoption of the invention to other types of machines, such as for clamping tools, is well within the competence of one skilled in the art, using the above descriptions.

The ON duration of the clamping drive motor is generally at maximum 2%, with the maximum output having to be brought to bear only for a fraction of this time. Thus the motor can be embodied as very small, without the danger of thermal overload. Contrarily, the spindle drive should be designed for an ON duration of 100%, so that the motor MII is substantially larger than the motor MI. This can be taken into account, however, by means of the different parameters supplied to the regulator, and the same applies for the resultant different regulating algorithms.

If the spindle 14 were not braked during the shutoff of its drive motor and the switching on of the clamping motor, then the clamping motor could turn the spindle, instead of shifting the driving screw, or could do both. However, it can be presumed that the spindle drive motor has a brake that locks it when the spindle drive is shut off. However, the danger still exists that in the event of a braking moment acting suddenly upon the revolving spindle, the rotor of the clamping motor will contnue to run at least briefly with its former speed, and depending on conditions may make the clamping force impermissibly great or even, in the opposite situation, unclamp the workpiece. For this reason, care is taken to couple the rotor mechanically to the spindle when the clamping motor is shut off.

To this end, as shown in FIG. 3, the stator core 40 of the clamping motor is axially lengthened with respect to the rotor core toward the spindle, and in the face region of the stator core, a coupling ring 130 having a radial serration is seated on the rotor in alignment with a counterpart serration 132 on the bushing 68. The coupling ring is mounted on bolts 134, which are biased by springs 136 in the direction of the tooth meshing.

The trigger unit in its preferred embodiment enables the separate imposition of the field-generating current components and of the torque-generating current components upon the stator winding 42. The regulating algorithm is accordingly laid out such that the field-generating component is always switched on first, and as a result the coupling ring—acting as the armature of the stator core, which then functions as a magnet—is released from the serration, and only then is the torque generated. In the shutoff process, naturally the procedure takes place in reverse order.

The parallel detection of rotational angle, clamping force and braking moment (via the operating parameters of the trigger unit) makes it possible to provide various monitoring functions. For instance, the play between the driving nut and the driving screw upon the reversal of rotational direction makes itself felt in a sharp drop of braking torque, and the associated rotational angle is then a standard for the "looseness" in the sliding thread drive and thus a standard for wear, so that for example if a predetermined threshold value is exceeded a warning signal can be emitted.

The level of the braking moment during the idle stroke $\beta_L$ is also a standard for the lubricant status of the threaded drive, and here again a warning signal can be generated if a predetermined threshhold value is exceeded.

In the exemplary second embodiment of FIG. 5, once again a sliding thread drive is provided in which however the friction-reducing coating mentioned initially is provided and the thread courses can therefore be located on a larger diameter, so the spindle can be embodied as hollow. The clamping motor is stationary with respect to the spindle rotation, and its rotor is coupled to the spindle only for the clamping or unclamping operation.

The general structure of the spindle stock need not be described again here; in this connection, see FIG. 2.

The tension/compression tube 152 is located inside the spindle 150, revolving with the spindle and being axially shiftable relative to the spindle for the sake of actuating clamping jaws. Screwed to the spindle is a flange 154, which via screws 156 carries a force storing assembly 158.

This assembly surrounds a supporting sleeve 160, in which an inner ring 162 is seated. A first cup spring 166 is axially supported on the end flange 164 of the inner ring, and on its other end this cup spring is clamped in place by a first intermediate ring 168. On its other side, a second cup spring 170 follows, clamped by a second intermediate ring 172. The supporting sleeve is fixed between this second inner ring and an annular nut 173, which is screwed onto the inner ring 162. The radially outer circumferences of the cup springs 166, 170 are fixed on an outer ring 174 by means of a further clamping ring 176 and an annular screw 178, which is screwed into the outer ring 174. From the outer ring 174, pins 180 extend into a slit 182 of the supporting sleeve 160, so that the two are coupled to one another in a rotationally fixed but axially displaceable manner.

The particular axial position of the outer ring 174 relative to the spindle and thus relative to the spindle box 184 is detected by means of a sensor 186, which is built into the spindle box.

The outer ring 174 is also joined via a crosswise roller bearing 188 to the nut 190 of a sliding thread drive, the hollow screw 192 of which is screwed to the tension/compression tube 152. Axial wedge grooves 194 on the outside of the screw 192 couple this screw in a rotationally fixed but axially displaceable manner to the inner ring 162 of the force storing assembly.

Upon rotation of the nut 190 relative to the screw 192—which when the spindle is at a standstill does not revolve either—the tension/compression tube 152 is accordingly axially shifted, until it is sharply braked, for example by the meeting of the clamping jaws with a workpiece; from then on, further rotation of the nut causes the nut to be axially screwed along the screw 192, axially shifting the outer ring 174, causing elastic deformation of the cup springs 166, 170, so that they store the clamping force.

The rotational movements required for clamping and unclamping are trasmitted by the nut 190 in the following manner:

In the spindle box 184, a coupling ring 198 is supported by means of roller bearings 196 and coupled via wedge grooves 200 in a rotationally fixed but axially displaceable manner to the nut 190. The coupling ring 198 has a radial serration 202.

A motor housing 204 is flanged to the spindle box, receiving the stator 206 of a clamping drive motor, and a sleeve 208 is screwed to the motor housing, extending inward from an end flange 210. Supported on the sleeve 208, by means of ball bearings 212, 214, is the rotor 216 of the motor, which is firmly connected to the coupling tube 218. The ball bearing 212 is displaceably seated on the sleeve 208, and the ball bearing 214 is displaceably seated in the coupling 218. Between the bearings 212 and 214, a restoring spring 220 is fastened, and during spindle rotation, or in other words when the clamping drive motor is without current, the restoring spring 220 keeps the rotor of the clamping drive motor in the axial position shown, which is defined by the stop ring 222.

The coupling tube 218 has a radial serration 224 on its inner end face, which can be made to mesh with the radial serration 202 of the coupling ring by means of axial shifting of the coupling tube 218, with compression of the spring 220. This is done by switching on the motor current, which causes retraction of the rotor into the stator. The two parts that couple with one another have circumferential teeth, which in cooperation with sensors 226 and 228, respectively, enable recognition of the angular location, so that the radial serrations are not damaged when the coupling is effected.

The entire apparatus is designed centrally symetrical with respect to the spindle axis, so that only the upper half needs to be shown in section.

Figure 7:
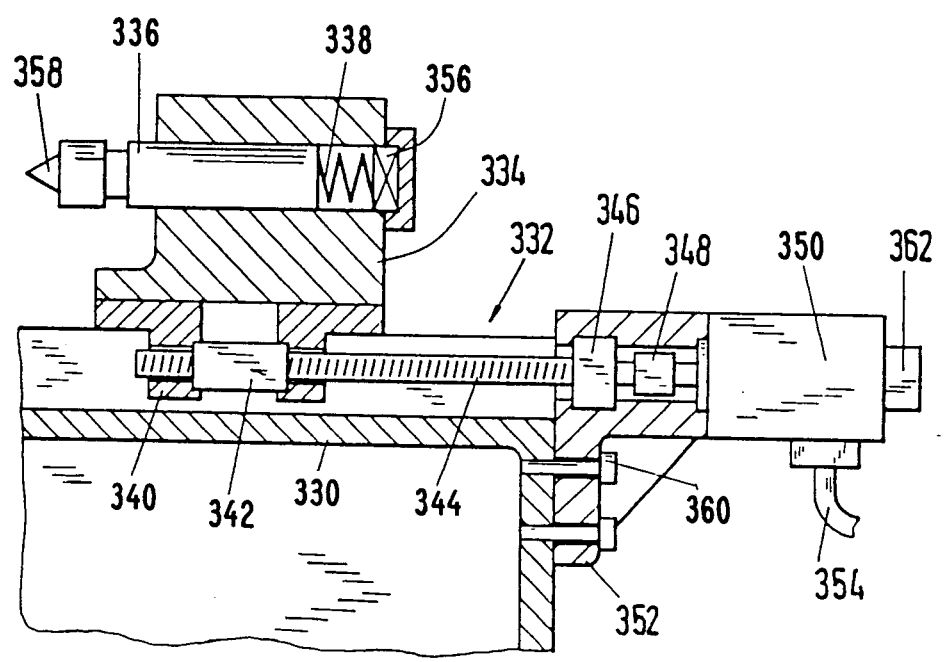
FIG. 7, in a longitudinal section, shows the tailstock of a lathe according to the invention.

FIG. 7 schematically shows an axial fragmentary section of the tail stock region of a lathe. The machine bed 330 has the linear guide 332 for the tailstock carriage 334 and spindle 336, in the usual manner, the end of the tailstock spindle 336 remote from the spindle stock being supported on a compression spring assembly 338. Shifting of the tailstock carriage is effected by means of a rolling thread drive, the nut 342 of which is retained at 340 and cooperates with the spindle 344 that can be driven for rotation. An axial bearing 346 absorbs the forces of reaction. Via a coupling 348, a servomotor 350, secured to the bed 330 by means of retaining brackets 352 (with screws 360), drives the spindle 344 for rotation and in so doing shifts the tailstock carriage 334. The motor is connected via a multiple conductor cable 354 to a trigger unit, preferrably the same trigger unit that is also associated with the clamping drive and the spindle drive. In addition to the output signal of a spring force sensor 356, which represents the pressing force exterted by the tip 358 of the tailstock spindle, a travel sensor 362 is also provided. This makes it possible to selectively attain a predetermined clamping force or predetermined adjusting distance. It will be understood that other servomechanisms of the same trigger unit can be operated by this same manner, on the condition that they do not have to be controlled simultaneously. Similarly, instead of the rolling thread drive 342/344 a sliding thread drive coated for friction reduction can be provided.

I claim:

1. An electrically actuated clamping device for a machine tool having a work spindle and a first motor for driving said spindle, said clamping device comprising:
   a sliding screw drive associated with and disposed coaxially relative to said spindle,
   a second motor comprising a three phase motor drivingly coupled to said screw drive, and
   a control means for continuously regulating energy supply to said second motor, said control means including frequency converter means for feeding said second motor with a three phase current comprised of a magnetizing current component and a torque-producing current component, and said control means further including a computer means for continuously adjusting both said magnetizing and torque-producing components in response to operational conditions of said second motor, and
   a sensor means for detecting an actual clamping force magnitude to produce an output signal in response thereto and to feed said output signal to said control means which, in response thereto during actuation of said clamping device to produce said clamping force, adjusts said current components after engagement of the clamping device with a workpiece, so as to reduce the speed of said second motor until a predetermined clamping force is achieved.

2. The device of claim 1 wherein said motors are operated only in alternation, and said control means is coupled to said first motor and said second motor, said control means being connected to means for providing at least one of (a) motor parameters to define a particular triggering time for the respective motor, (b) regulating algorithms, and (c) actual and set-point values of the motor; and
   switching means for alternately driving the first motor and the second motor by switching the outputs of the control unit from one of said first and second motors to the other.

3. The device of claim 2, wherein the switching means comprises a higher CNC means.

4. The device of claim 2, wherein the switching means comprises an internal computer of the control unit.

5. The device of claim 1 wherein said sliding screw drive includes a worm member and a nut member having interengaging threads, said threads of at least one of said members being surface treated so as to reduce the effective friction coefficient.

6. The device of claim 5, wherein said surface treating includes a coating which is chemically precipitated from a gas phase.

7. The device of claim 6, wherein the coating comprises diamond-like carbon.

8. The device of claim 1 wherein said second motor has a rotor directly coupled to said sliding screw drive at least during production of said thrust force.

9. The device of claim 8, wherein said second motor has a stator which is stationary.

10. The device of claim 8, wherein said rotor is disposed coaxially with said screw drive and rotates therewith.

11. The device of claim 1 further comprising clamping force storage means including a spring.

12. The device of claim 1 further comprising means for locking the work spindle relative to the spindle housing.

13. The device of claim 1, wherein a rotor of said second motor is disposed stationary, and a switchable coupling is provided between it and a clamping unit.

14. the device of claim 11, wherein a switching member of said coupling is shiftable by means of a magnetizing flux of said second motor.

15. An electrically actuated clamping device for a lathe having a work spindle and a first motor for driving said spindle and a tailstock, said tailstock including a tailstock body axially displaceable relative to said spindle and a thrust member housed in said tailstock body and axially displaceable relative to said body against bias of a thrust-force-producing spring, a sliding screw drive having an axis parallel to said spindle and coupled to said tailstock body for axial displacement thereof, said tailstock further comprising:
   a second motor comprising a three phase motor for actuating said sliding screw drive,
   a control means for continuously regulating energy supply to said second motor which is a three phase motor, said control means including frequency converter means for feeding said second motor with a three phase current comprised of a magnetizing current component and a torque-producing current component, and said control means further including a computer means for continuously adjusting both said magnetizing and torque-producing components in response to operational conditions of said second motor, and
   a sensor means for detecting an actual thrust force magnitude to produce an output signal in response thereto and to feed said output signal to said control means which, in respone thereto, during actuation of said tailstock drive to produce said thrust force, adjusts said magnetizing and torque-producing current components ater engagement of the clamping device with a workpiece, so as to reduce the speed of said second motor until a predetermined thrust force is achieved.

16. The lathe of claim 15, including a clamping device mounted on said spindle, and said clamping device comprising:

a sliding screw drive associated with and disposed coaxially relative to said spindle,
   a second motor comprising a three phase motor drivingly coupled to said screw drive, and
   a control means for continuously regulating energy supply to said second motor, said control means including frequency converter means for feeding said second motor with a three phase current comprised of a magnetizing current component and a torque-producing current component, and said control means further including a computer means for continuously adjusting both said magnetizing and torque-producing components in response to operational conditions of said second motor, and
   a sensor means for detecting an actual clamping force magnitude to produce an output signal in response thereto and to feed said output signal to said control means which, in response thereto during actuation of said clamping device to produce said clamping force, adjusts said current components after engagement of the clamping device with a workpiece, so as to reduce the speed of said second motor unitl a predetermined clamping force is achieved.

17. The lathe of claim 16, wherein a common control means is successively coupled to said first and second motors of the tailstock.

18. The device of claim 15, wherein a rotor of said second motor is disposed stationary, and a switchable coupling is provided between it and a clamping unit.

19. The device of claim 18, wherein a switching member of said coupling is shiftable by means of a magnetizing flux of said second motor.

20. The device of claim 15 wherein said sliding screw drive includes a worm member and a nut member having interengaging threads, said threads of at least one of said members being surface treated so as to reduce the effective friction coefficient.

21. The device of claim 20, wherein said surface treating includes a coating which is chemically precipitated from a gas phase.

22. The device of claim 21, wherein the coating comprises diamond-like carbon.

23. The device of claim 15 wherein said second motor has a rotor directly coupled to said sliding screw drive at least during production of said thrust force.

* * * * *